Aug. 15, 1967         H. L. HUTCH         3,335,777
BREAKER ARRANGEMENT FOR PNEUMATIC TIRES
Filed Oct. 8, 1965
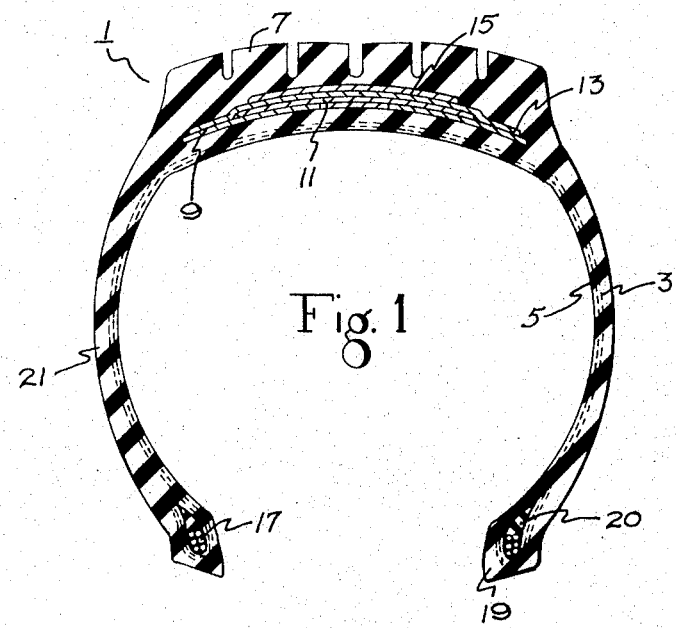
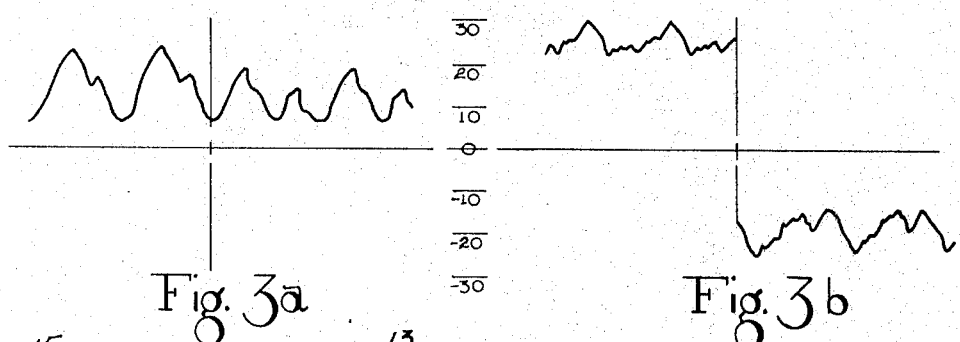
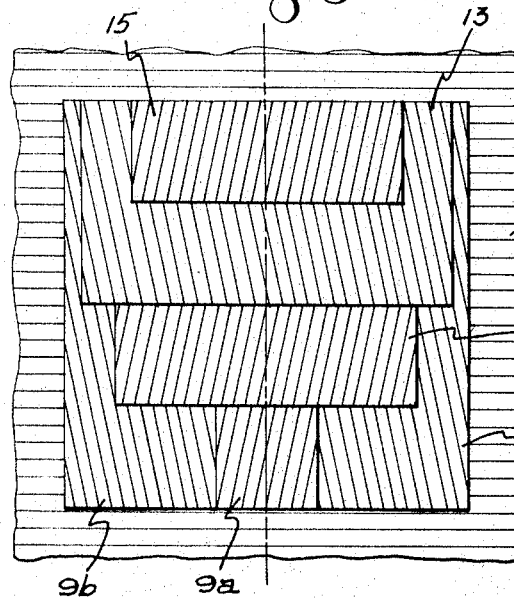
INVENTOR
Harry L. Hutch
BY Frank F. Lambert
   James A. Lucas
ATTORNEYS

United States Patent Office 3,335,777
Patented Aug. 15, 1967

3,335,777
BREAKER ARRANGEMENT FOR
PNEUMATIC TIRES
Harry L. Hutch, Stow, Ohio, assignor to The General
Tire & Rubber Company, a corporation of Ohio
Filed Oct. 8, 1965, Ser. No. 493,967
10 Claims. (Cl. 152—361)

ABSTRACT OF THE DISCLOSURE

A breaker assembly, having particular applicability to radial tires, utilizes a principle which is designed to minimize the lateral forces which are primarily responsible for vehicle drift. According to this principle, the innermost breaker is composed of three separate but contiguous strips, the cords in the center strip running in a direction which is opposite, measured from the circumferential plane of the tire, to that of the cords in the two outer strips.

Details of the invention

This invention relates to an improvement in pneumatic tires, and more particularly it relates to an improvement in tires of the type having a breaker extending around the carcass thereof. Yet more particularly, this invention is concerned with a method of reducing, to an acceptable level, the lateral drift found to exist in belted tires and the tires thus produced.

Tires classified according to carcass construction generally fall into one of two groups. The first group, commonly referred to as bias-ply tires, derives its name from the fact that the carcass is composed of two or more plies of rubberized cord fabric extending from one bead of the tire to the other bead at a bias angle of about 25° to 45° as measured from the center line of the tread (hereinafter referred to as the circumferential plane of the tire). The cords of adjacent carcass plies generally run in an opposite bias direction to one another when measured from this plane. It has generally been found that this type of construction offers a reasonable compromise between stability, riding characteristics, and wear. Among the drawbacks of bias-ply tires is the fact that maximum use is not made of the load bearing properties of the cords utilized in the carcass fabric. Furthermore, when a vehicle is rounding a curve or turning a corner, a relatively large slip angle is formed between the pavement and the tire, and this tends to create a counteracting side thrust. This in turn causes the adjacent carcass layers to shear against one another resulting in the build-up of heat which causes degradation of the components of the tire. This shearing effect between the adjacent plies is also present, to a lesser extent, when the vehicle is moving in a straight line.

Some of the problems inherent in the construction of the bias-ply tires can be overcome by arranging the layers of the carcass so as to form cord angles which are much higher than those found in the bias-ply tire. When the angle is at or near its maximum, i.e., 90°, the tire is referred to as a radial tire. A tire in which the cord angles range from about 45° to about 87° or 88° is referred to as a semi-radial tire, a term which will be used throughout the remainder of this discussion interchangeably with the term radial tire. With the cords of the carcass plies crossing from bead to bead at this much higher angle, the tensile strength of the cords is more efficiently utilized to support the vehicle. In addition, the shearing between the adjacent plies is reduced as the angle between them approaches zero. However, the lateral instability of a carcass made in this manner is much greater than that of a comparable bias-ply tire. To correct this problem, a relatively inextensible breaker or belt is interposed between the carcass and the tire tread, the cords of said breaker forming a low angle measured from the center line of the tread. It has been found that the thus constructed radial or semi-radial ply tire can improve the handling characteristics of a vehicle, with the further benefits of better tread wear and traction than the comparable bias-ply tire.

Although the radial or semi-radial ply tire has overcome some of the difficulties inherent in bias-ply tires, it has also introduced some characteristic drawbacks of its own. One of these results in a tendency of the vehicle to drift to the left or the right. This tendency is apparently caused by the unbalanced lateral forces in the tire which is much more pronounced in radial tires than it is in bias-ply tires. In extreme cases the force unbalance in the tires can cause the vehicle to swerve quite noticeably if the steering wheel is not restrained.

A typical tire that develops an appreciable amount of lateral force, while rotating in one direction, will also exhibit a large lateral force if the direction of rotation is reversed. Efforts have heretofore been directed to methods of reducing the amount of this force in one rotational direction to an acceptable level. However, this has not necessarily resulted in any appreciable reduction of the force in the other direction. Consequently, the tire maker would mark or label the tire to indicate the preferred direction of rotation, thereby permitting the owner of the vehicle to selectively mount the tire thereon.

It is one object of this invention to produce a radial or semi-radial tire that has a limited tendency to cause drift.

Another object of this invention is to provide a unique breaker arrangement which provides a better balance of lateral forces than has heretofore been found in radial tires.

It is yet another object of this invention to provide a method of reducing the lateral forces in a radial tire by utilizing a unique arrangement of the cords in the innermost breaker of the tire.

Another object is to provide a radial tire which can be rotated in either direction without regard to the lateral forces within the tire.

These and other objects, which will be more clearly understood in light of the following specification and claims, are accomplished by wrapping a plurality of substantially inextensible breakers around the carcass of the tire, the innermost breaker consisting of three contiguous strips. The cords of the middle strip overlie the crown of the carcass and are inclined at an angle which is opposite, with respect to the center line of the tread, to the cord angle of the side strips. The details of this invention will be more clearly understood with reference to the following figures in which:

FIGURE 1 is a cross section of a radial or semi-radial ply tire showing the general arrangement of the component parts thereof;

FIGURE 2 represents a plane view of a portion of the tire with parts broken away showing one of the carcass plies and the arrangement of breakers;

FIGURE 3a is a chart showing the lateral uniformity of a radial tire built according to the teachings of this invention; and FIGURE 3b is a similar chart of a radial tire built according to conventional prior art techniques.

In its broadest aspect, this invention relates to a pneumatic tire having a carcass containing at least one ply, the cords of which form an angle of at least 45° with reference to the circumferential plane through the tire, an elastomeric tread portion, and at least two breakers interposed between the carcass and the tread portion. Each breaker is composed of a plurality of closely spaced parallel cords forming an angle of less than 45° with said circumferential plane. The innermost breaker comprises three contiguous strips, each of which extends circumferentially around the carcass of the tire and comprises an elastomer-coated layer of closely spaced parallel cords, the cords in the middle strip having an inclination with reference to the circumferential plane of the tire which is opposite to that of the cords in the strips contiguous to said middle strip.

Referring now to FIGURE 1, there is shown a pneumatic tire 1 of conventional cross-sectional shape and comprising a carcass having two plies 3 and 5, a tread portion 7 adapted to contact the surface of the road, and a plurality of breakers 9, 11, 13, and 15 interposed between the carcass and the tread. The carcass plies are preferably of conventional construction, each ply consisting of a plurality of closely spaced cords of textile or other material coated with a suitable elastomer to form a sheet. The edges of the two plies 3 and 5 are folded around inextensible bead bundles 17 and fillers 20 to form the beads 19 of the tire. The beads contact the rim of the wheel and serve to maintain the inflated tire on the rim. It is understood, of course, that this tire may be of the tubeless type, in which an impervious inner liner, made from a suitable material such as butyl or chlorobutyl rubber, is disposed around the inner surface of the carcass; or the tube type, in which case a conventional inner tube is inserted in the tire. An appropraite sidewall 21 is provided on the outside of the carcass between the bead and the tread of the tire, and may include appropriate decorative inserts of white or colored rubber.

The construction and arrangement of the four breakers 9, 11, 13, and 15, wrapped around the carcass of a radial tire, are clearly shown in FIGURE 2. The innermost breaker 9 consists of three strips of breaker material, a center strip 9a and two lateral strips 9b on either side of the center strip. As shown, each of the strips consists of a plurality of parallel cords which are preferably coated with an elastomer according to conventional practices. The cords in the two lateral strips 9b all extend in the same direction and form the same angle with respect to the circumferential plane of the tire, while the cords in the center strip 9a extend in the opposite direction thereto. Preferably, but not necessarily, the cord angle of the strip 9a is equal but opposite to the angle of the strips 9b. This angle can be as high at 45° but is preferably less than 20°, as measured from the circumferential plane of a tire. This innermost breaker 9 may be disposed directly on top of the outer carcass ply 3, in which case the cords of the breaker are separated from the carcass ply by two thin layers of elastomer covering the respective plies; or, alternatively, an additional cushion of rubber or the like can be interposed between the outermost carcass ply and all or part of the innermost breaker.

The center strip 9a is preferably contiguous to the outer strips 9b, with no space being provided therebetween. The width of the center strip is generally about 25 percent of the total width of the innermost breaker. It should be understood, however, that deviations from this figure will not adversely affect the effectiveness of this breaker. Accordingly, the center strip 9a can vary from 10 or 15 percent to 30 or 40 percent of the total width of said breaker. The overall width of the inner breaker 9 can vary from that shown in FIGURE 2, it being within the contemplation of the invention that the breaker may be considerably narrower than the width of the tread, or may be wide enough to extend partially into the sidewall portions of the tire.

The next three successive breakers 11, 13, and 15 are all wrapped around said innermost breaker 9 and are centrally positioned relative to the crown of the tire. The breaker arrangement as shown with the second breaker 11 and the fourth breaker 15, being substantially narrower than the innermost breaker 9 and the third breaker 13, has been found to be particularly effective. However, it should be understood that the number of breakers, as well as their width relative to one another, can be varied without deviating from the scope of this invention which resides primarily with the construction of the innermost breaker. It has been found, however, that a minimum of two breakers are necessary in the construction of this novel radial tire, and that the cords of the center strip 9a of the innermost breaker 9 extends in the same direction as the cords of the next adjacent breaker 11.

Various lateral forces are produced between a tire and the surface over which it rolls, said forces being distributed over the entire contact area or footprint between the tire and the surface. These forces are present even in a well made and accurately balanced tire. Certain of these forces, which act through the geometrical centerline of the footprint in the direction of travel, but to one side thereof, appear to simulate the forces produced when a tire is cambered or inclined from the vertical, and are accordingly referred to as pseudo-camber or residual camber. These forces by themselves do not ordinarily create a torque of the type which would cause a vehicle to drift.

Certain other forces which act in the lateral direction and which seem to have the same effect as a tire rolling at a slight slip angle (non-parallel to the direction of motion) are referred to as pseudo-slip or residual slip. The center of these forces is generally ahead of the geometrical center of the contact area thereby giving rise to a torque which is equal to the force times the length of the moment arm. This torque, operating on a tire at a location which is remote from the geometrical center thereof, produces a pivoting effect on the tire about said center, thereby causing the vehicle to drift.

Thus, it appears that the presence of pseudo-camber does not, by itself, create any serious drift problem, and that most of the problem is caused by pseudo-slip forces. Therefore, by eliminating or minimizing the forces which contribute to pseudo-slip, it is felt that the problem of tire drift is appreciably reduced. According to the teachings of applicant's invention, these detrimental lateral forces are greatly reduced and the concomitant drift problem is largely eliminated.

FIGURES 3a and 3b represents copies of two oscillograms showing the lateral forces produced in tires mounted and rotated on a test apparatus commonly called a tire uniformity machine. This machine functions to measure the lateral and radial forces of a rotating tire, and consists of a tire mounting device, a test drum, and appropriate load cells or sensors which measure these forces. The tire is mounted upon a rim and is inflated to normal operating pressure. The tread of the tire is placed against the test drum at zero degree camber and zero degree slip, and a given initial load is applied to the tire in the radial direction. The tire axle and test drum axle are maintained at a fixed distance from one another (for force measurements) while the tire is rotated in one direction. The magnitude and direction of various forces are measured by the sensors (load cells) mounted on the ends of the axle of the test drum, and these values are amplified and separately displayed in both magnitude and direction on an oscillograph chart. The rotation of the tire is then reversed, and again the magnitude and direction of the radial and lateral forces are displayed on the chart.

The left-hand side of FIGURE 3a represents the induced lateral forces produced when the tire, built according to the teachings of the invention, was rotated in a counter-clockwise direction, and the right-hand side of the graph represents the forces produced upon clockwise rotation, it being noted that the direction of rotation is the only condition that is changed. The vertical line at the center of the graph represents the transition from counter-clockwise to clockwise rotation. The tire which produced this lateral force trace had the following construction: The carcass was composed of two plies, each of a calendered rayon fabric having an end count of 20 ends per inch in the cured condition. The cord angle of the plies was 90°, as measured from the circumferential plane of the tire. Disposed between the carcass and the tread were four breaker plies, each constructed of calendered parallelized cords of 1650/3 rayon having a 24 end count in the cured state. The innermost breaker was four inches wide with the center strip of the same being one inch wide and being centrally positioned overlying the carcass. The cords in this center strip were disposed at a 12° right-hand angle relative to the center line of the tire. The strips on either side of the center strip were each one and one-half inches wide, and the cords therein formed a 12° left-hand angle. The breaker next adjacent to the innermost breaker was three and one-fourth inches wide, while the third breaker was three and three-fourths inches wide, and the outer breaker was two and three-fourths inches wide. The cords in the second and fourth breakers formed a right-hand angle of 12°, while the cords in the third breaker formed a left-hand angle of the same magnitude.

In FIGURE 3a it can be seen that the lateral forces developed in the tire when rotating in the counter-clockwise direction had a maximum value of about 24 pounds and in the clockwise direction about 18 pounds, there being no difference in the direction of this force when the direction of rotation was reversed.

In FIGURE 3b, however, a lateral force trace of a similarly constructed tire, but without any modification of the innermost breaker, is shown, and it can be seen that the chart pattern is substantially different. The innermost breaker of the tire used in this test had all the cords thereof extending in the same direction. Consequently, when the direction of tire rotation was reversed, the lateral forces shifted from one side of the zero line to the other side. In the counter-clockwise direction a maximum lateral force of 30 pounds was generated, and in the clockwise direction the maximum force was approximately 26 pounds.

This invention shows a definite improvement over previous attempts to control drift. These efforts have been directed at obtaining a low pseudo-slip force in one direction of rotation. However, this would be accomplished at a sacrifice of having a large pseudo-slip force when the direction of rotation was reversed. Thus, it was necessary to specify the direction in which a tire should be rotated when installed on a vehicle. The present invention provides a means to control the drift to such an extent that the tire can be rotated in either direction without encountering a severe drift problem.

It appears that the innermost breaker next to the carcass is instrumental in initiating and/or controlling drift through its inter-action in shear with the carcass and the other breakers. The invention apparently solves this problem by uniformly distributing the stresses in the tire, resulting in a minimum of lateral forces which cause pseudo-slip. Thus, even though the total lateral forces within a tire built according to the teachings of this invention are only slightly less than those in a comparable tire built according to prior art methods, the drift tendency of the vehicle is greatly reduced.

There are a number of factors which will affect the over-all operation of a tire built according to the teachings of this invention and must be taken into consideration when determining the design parameters of the various breakers. One of these is the angle of the cords in the strips constituting the innermost breaker as well as the cord angles in the other breakers. As previously stated, these angles, somewhat dependent upon the cord angles in the carcass, can vary from 0° up to about 45°, although they are more typically between about 5° and about 15°. It is apparent, however, that as the cord angle of the breakers approaches 0°, the corrective effect of reversing the cord angle of the center strip of the innermost breaker diminishes.

Other factors which must be considered when constructing a tire according to the teachings of this invention are the type and size as well as the calendered thickness and end count of the cord material used in making the breakers. Accordingly, the cords in the breakers can be made from nylon, rayon, polyester, fiberglass, or various metals such as brass coated steel wire. The cords in the innermost breaker may be of a different material than those in the other breakers. Furthermore, the cord material, and/or end count in the center strip of this innermost breaker may be different than in the lateral strips.

Furthermore, the number and spacing of the breakers from one another and from the carcass would also have to be taken into consideration in determining the optimum width of the various strips in the innermost breaker. This also includes factors such as the use of cushion strips to insulate the same from the carcass and from one another.

The construction of the carcass will also have a bearing upon the design parameters of the innermost breaker used in carrying out the teachings of this invention. Since the problem of lateral drift is primarily limited to vehicles having radial or semi-radial tires, it is obvious that as the cord angles of the tire carcass approaches those found in a conventional bias-ply tire, the severity of the problem decreases and the correctional action correspondingly becomes less important.

The invention is applicable to multiple bead, as well as single bead, tires and to heavy duty tires having a large number of carcass plies. Furthermore, instead of being used to eliminate or minimize drift, the teachings of this invention can be used to intentionally build a tire which increases the amount of drift.

Various other modifications and deviations can be made in the breaker arrangement as described in this invention without departing from the novel scope thereof. For instance, the use of discrete oriented fibers instead of continuous cords can be used in the breakers, with appropriate modifications being made in the innermost breaker. Furthermore, other design deviations, well known in the art of tire building, can be made without departing from the spirit of this invention and the scope thereof which is limited only by the appended claims in which I claim:

1. A pneumatic tire having a carcass in which the cords form an angle of at least 45° as measured from the circumferential plane through the tire, an elastomeric tread, and a breaker assembly interposed between the carcass and the tread, said breaker assembly composed of a plurality of breakers, each breaker consisting of a plurality of elastomerized closely spaced parallel cords forming an angle of less than 45° with said circumferential plane, the improvement of which resides in that the innermost breaker comprises three contiguous strips; a middle strip overlying the crown of the carcass, and a strip on either side of said middle strip, the cords of the middle strip inclined in the same direction as the cords in the next adjacent breaker and at an angle which is opposite in direction, with respect to the circumferential plane of the tire, to that of the strips at the sides.

2. A tire according to claim 1 wherein the width of the center strip is between about 10 percent and about 40 percent of the total width of the innermost breaker.

3. A tire according to claim 2 wherein the width of the center strip is approximately 25 percent of the total width of the tire.

4. A tire according to claim 1 wherein the cord angles formed by the three strips in the innermost breaker are all equal.

5. A tire according to claim 1 wherein the cords in said breaker assembly are metallic.

6. A tire according to claim 1 wherein the cords in said breaker assembly are non-metallic.

7. A generally circumferentially extending breaker assembly disposed around the carcass of a radial or semi-radial tire and adapted to reduce the lateral forces developed within the tire during rotation comprising a plurality of individual breakers, the innermost breaker composed of three strips abutting one another, the center strip overlying the crown of the carcass having cords which extend in a direction which is opposite to that of the cords in the strips at either side thereof and in the same direction as the cords in the next adjacent breaker.

8. A breaker assembly according to claim 7 wherein the width of the center strip is between approximately 10 percent and 40 percent of the total width of the innermost breaker.

9. The breaker assembly according to claim 7 wherein all of the cords in said assembly are disposed at the same angle, with respect to the circumferential plane of the tire, with the cords of the center strip parallel to the cords in the next adjacent breaker.

10. A radial ply pneumatic tire which may be rotated in either direction without exhibiting any appreciable tendency to drift, and having a carcass composed of at least one ply of closely spaced parallel elastomer coated cords forming an angle of about 90° with respect to the circumferential plane of the tire, an elastomeric tread portion overlying the crown of said carcass, and a breaker assembly comprising at least two breakers disposed between said carcass and said tread, each of said breakers composed of a plurality of closely spaced parallel cords forming an angle of less than about 20° with respect to said circumferential plane, the innermost breaker disposed immediately adjacent and over said carcass comprising three separate strips, a center strip and two lateral strips with the width of the center strip comprising between 10 and 40 percent of the total width of the innermost breaker, the cords in the center strip extending in the same direction, and at substantially the same angle as the cords in the next adjacent breaker thereabove and at an equal but opposite angle to the lateral strips contiguous thereto.

References Cited
UNITED STATES PATENTS

| | | | |
|---|---|---|---|
| 1,842,353 | 1/1932 | Loventz | 152—361 |
| 3,126,042 | 3/1964 | Cegnar | 152—361 |
| 3,175,598 | 3/1965 | Boussu et al. | 152—361 |

ARTHUR L. LA POINT, *Primary Examiner.*

C. W. HAEFELE, *Assistant Examiner.*